(12) United States Patent
Negi

(10) Patent No.: US 8,165,387 B2
(45) Date of Patent: Apr. 24, 2012

(54) INFORMATION PROCESSING APPARATUS AND METHOD, PROGRAM, AND RECORDING MEDIUM FOR SELECTING DATA FOR LEARNING

(75) Inventor: Daisuke Negi, Tokyo (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 12/237,505

(22) Filed: Sep. 25, 2008

(65) Prior Publication Data

US 2009/0092313 A1    Apr. 9, 2009

(30) Foreign Application Priority Data

Oct. 4, 2007    (JP) ................. P2007-260597

(51) Int. Cl.
    *G06K 9/62*    (2006.01)
(52) U.S. Cl. .......... 382/160; 382/190; 382/228
(58) Field of Classification Search .......... None
    See application file for complete search history.

(56) References Cited

U.S. PATENT DOCUMENTS

| | | | | |
|---|---|---|---|---|
| 2005/0058337 A1* | 3/2005 | Fujimura et al. | ............... | 382/159 |
| 2008/0089579 A1* | 4/2008 | Han et al. | ............... | 382/159 |
| 2009/0116749 A1* | 5/2009 | Cristinacce et al. | .......... | 382/195 |

FOREIGN PATENT DOCUMENTS

| | | |
|---|---|---|
| JP | 2005-100122 | 4/2005 |
| JP | 2005-332206 | 12/2005 |
| JP | 2007-058603 | 3/2007 |

OTHER PUBLICATIONS

Office Communication from the Japanese Patent Office dated Nov. 15, 2011.

* cited by examiner

*Primary Examiner* — Brian Werner

(74) *Attorney, Agent, or Firm* — Finnegan, Henderson, Farabow, Garrett & Dunner, LLP.

(57) ABSTRACT

An information processing apparatus includes a statistical analysis processing device configured to perform statistical analysis processing, an acquisition device configured to acquire samples to be processed by the statistical analysis processing device, a classification device configured to classify the samples acquired by the acquisition device, and a selection device configured to select from the samples classified by the classification device learning samples to be used in the statistical analysis processing by the statistical analysis processing device.

7 Claims, 3 Drawing Sheets

INFORMATION PROCESSING APPARATUS AND METHOD, PROGRAM, AND RECORDING MEDIUM FOR SELECTING DATA FOR LEARNING

CROSS REFERENCES TO RELATED APPLICATIONS

The present invention contains subject matter related to Japanese Patent Application JP 2007-260597 filed in the Japanese Patent Office on Oct. 4, 2007, the entire contents of which are incorporated herein by reference,

BACKGROUND OF THE INVENTION

1. Field of the Invention

The present invention relates to an information processing apparatus and method, a program, and a recording medium, particularly to an information processing apparatus and method, a program, and a recording medium that select more appropriate data for learning and perform analysis such as principal component analysis, for example, by using the selected data, to thereby improve the accuracy of the result of the analysis.

2. Description of the Related Art

In the field of pattern recognition, statistical analysis methods such as the principal component analysis have been used to compress the dimension of a feature quantity. In such statistical analysis methods, statistical analysis is performed on samples (data) expected to be input to a system. For example, if image data is expected as an input to the system, image data is prepared as learning samples, and statistical analysis is performed on the image data (see Japanese Unexamined Patent Application Publication No. 5-199071).

SUMMARY OF THE INVENTION

The capacity of a storage area, such as a RAM (Random-Access Memory), for example, of a calculator used to perform analysis, and the time spared for the analysis are limited. For example, if the pixel value of an image is directly used as the feature quantity, the amount of data of each sample is enormous. In terms of the storage capacity, therefore, it is difficult to store a large number of samples. Thus, there is a limitation in increasing the number of samples. Further, an increase in the number of samples results in an increase in the analysis time. Thus, the limitation in increasing the number of samples is also imposed by the time limitation.

Further, if the respective frames of video are input, for example, the number of samples is enormous. Thus, it is necessary to limit the amount of data of each of the samples. For example, to reduce the amount of data of each of the frames, a process of previously reducing the size of an image to reduce the amount of data may be performed to thereafter store the video as a sample. However, if two hours of video including thirty frames per second is used, as a sample, for example, it is necessary to store two hundred, thousands or more of frames. Even if the amount of data of each of the frames is reduced, the amount of data to be stored is large.

Therefore, if is preferable to set the amount of data of each sample to the minimum amount, with which the feature desired to be expressed can be sufficiently expressed. Thus, to directly use the pixel value of an image as the feature quantity, for example, it is conceivable to reduce only an important area of the image to the minimum necessary resolution to foe used as a sample.

When the learning samples considered necessary for learning are selected from the sample stored as described above, it is preferable to set the number of the selected learning samples to the largest number with which the limitations in the storage capacity and the calculation time are satisfied. This is because the larger the number of the learning samples is, the more accurately the statistical analysis can be performed. Even if the learning samples are selected in a preferable form, however, it is difficult to obtain an optimal analysis result unless optimal learning samples are selected. Thus, there has been a necessity to select the optimal learning samples.

The present invention has been made in view of the above circumstances. It is desirable to select, as samples for learning to be used in analysis, appropriate samples to produce a desirable analysis result.

An information processing apparatus according to an embodiment of the present invention includes statistical analysis processing means for performing statistical analysis processing, acquisition means for acquiring samples to be processed by the statistical analysis processing means, classification means for classifying the samples acquired by the acquisition means, and selection means for selecting from the samples classified by the classification means learning samples to be used in the statistical analysis processing by the statistical analysis processing means.

The statistical analysis by the statistical analysis processing means may include principal component analysis.

The samples may include predetermined scenes of a program broadcast by television broadcasting. The classification means may divide each of the scenes into two or more portions. The selection means may select a predetermined number of the learning samples from each of the divided scenes.

The selection means may select many of the learning samples from highly important samples of the samples.

An information processing method according to an embodiment of the present invention is performed by an information processing apparatus including statistical analysis processing means for performing statistical analysis processing. The information processing method includes the steps of acquiring samples to be processed by the statistical analysis processing means, classifying the acquired samples, and selecting from the classified samples learning samples to be used in the statistical analysis processing by the statistical analysis processing means.

A program according to an embodiment of the present invention controls an information processing apparatus including statistical analysis processing means for performing statistical analysis processing. The program, causes a computer to perform processing including the steps of acquiring samples to be processed by the statistical analysis processing means, classifying the acquired samples, and selecting from the classified samples learning samples to be used in the statistical analysis processing by the statistical analysis processing means.

A program recorded on a recording medium according to an embodiment of the present invention causes a computer controlling an information processing apparatus including statistical analysis processing means for performing statistical analysis processing to perform processing including the steps of acquiring samples to be processed by the statistical analysis processing means, classifying the acquired samples, and selecting from the classified samples learning samples to foe used in the statistical analysis processing by the statistical analysis processing means.

In the information processing apparatus and method and the program according to the embodiments of the present invention, the samples to be used in the statistical analysis processing are classified and a set number of the learning samples are extracted from each of the portions obtained, after the classification, such that processing using the analysis result of the statistical analysis processing can be appropriately performed.

According to the embodiments of the present invention, to obtain a desirable analysis result, desirable data can be selected as the data to foe used in the analysis.

DESCRIPTION OF THE PREFERRED EMBODIMENTS

Figure 1:
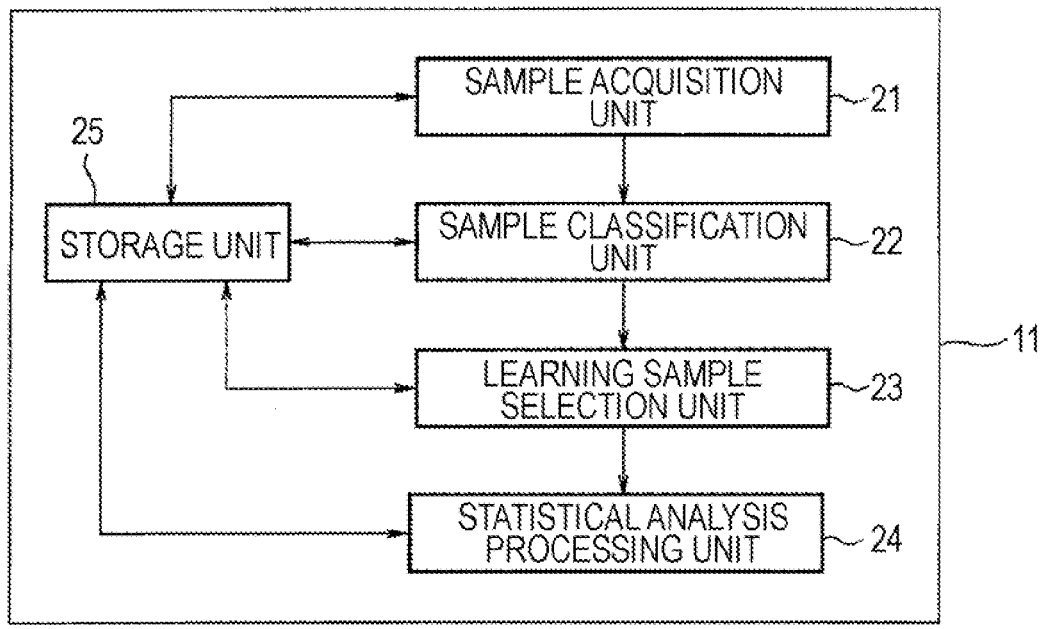
FIG. 1 is a diagram illustrating a configuration of an embodiment of an information processing apparatus applied with the present invention.

Embodiments of the present invention will be described below. The correspondence relationship between the constituent features of the present invention and the embodiments described in the specification or the drawings will be exemplified as follows. This description is for confirming that the embodiments supporting the present invention are described in the specification or the drawings. Therefore, even if there is an embodiment described in the specification or the drawings but not described herein as the embodiment corresponding to the constituent features of the present invention, this does not mean, that the embodiment does not correspond to the constituent features. Conversely, even if the embodiment is described herein to correspond to the constituent features, this does not mean that the embodiment does not correspond to the other constituent features.

An information processing apparatus according to an embodiment of the present invention (e.g., an information processing apparatus 11 of FIG. 1) includes statistical analysis processing means for performing statistical analysis processing (e.g., a statistical analysis processing unit 24 of FIG. 1), acquisition means for acquiring samples to be processed by the statistical analysis processing means (e.g., a sample acquisition unit 21 of FIG. 1), classification means for classifying the samples acquired by the acquisition means (e.g., a sample classification unit 22 of FIG. 1), and selection means for selecting from the samples classified by the classification means learning samples to be used in the statistical analysis processing by the statistical analysis processing means (e.g., a learning sample selection unit 23).

The embodiments of the present invention will be described below with reference to the drawings.

FIG. 1 is a diagram illustrating a configuration of an embodiment of an information processing apparatus applied with the present invention. The information processing apparatus 11 illustrated in FIG. 1 is configured to include the sample acquisition unit 21, the sample classification unit 22, the learning sample selection unit 23, the statistical analysis processing unit 24, and a storage unit 25.

The information processing apparatus 11 illustrated in FIG. 1 performs the statistical analysis processing in the statistical analysis processing unit 24. The information processing apparatus 11 forms an apparatus capable of acquiring and selecting appropriate samples (learning samples) to be used in the statistical analysis processing. The result of the analysis performed by the statistical analysis processing unit 24 is used in processing performed at a subsequent stage not illustrated. The learning samples are selected such that an appropriate analysis result for the processing performed at the subsequent stage can be obtained.

If inappropriate samples are included in a group of samples to be used in the statistical analysis processing performed by the statistical analysis processing unit 24, the inappropriate samples may affect the analysis result and make the analysis result inappropriate (prevent an intended purpose from being desirably attained when the analysis result is used in the processing at the subsequent stage). Therefore, to prevent the inappropriate samples from being included in the samples to be used by the statistical analysis processing unit 24, the present embodiment is configured such that appropriate samples are selected from the acquired samples, and that analysis using the thus selected samples is performed, to thereby make the analysis result appropriate.

The sample acquisition unit 21 acquires the samples. The sample classification unit 22 classifies the plurality of samples acquired by the sample acquisition unit 21 on the basis of a predetermined rule. The learning sample selection unit 23 selects from the samples classified by the sample classification unit 22 the samples to be used by the statistical analysis processing unit 24. The statistical analysis processing unit 24 performs the statistical analysis processing using the samples selected by the learning sample selection unit 23, and outputs the analysis result to the subsequent stage not illustrated.

In the following description, data acquired by the sample acquisition unit 21 will be referred to as the samples. Further, the samples to be selected or selected from the samples by the learning sample selection unit 23 will be referred to as the learning samples.

Detailed description will be made later with reference to an example. For example, the samples acquired by the sample acquisition unit 21 include a program broadcast as a television broadcast, and a predetermined scene of the program is extracted, as a sample. In this case, a plurality of scenes may be extracted from one program or a plurality of programs. The sample acquisition unit 21 acquires a plurality of samples.

The sample acquisition unit 21 can also foe configured to be able to acquire samples acquirable via a network, samples stored in a personal computer or the like, and so forth. In such a configuration, the thus acquired samples can also be processed in the processing at the subsequent stage.

If a predetermined scene of a program is acquired as a sample by the sample acquisition unit 21, the sample classification unit 22 classifies the acquired predetermined scene of the program in accordance with a predetermined rule. The predetermined rule relies on the content of the sample, how the analysis result of the statistical analysis processing is used, and so forth. For example, the division of a scene into the former part and the latter part is conceivable as the predetermined rule.

From the scene (the sample) of the program classified in accordance with the predetermined rule, the learning sample selection unit 23 extracts the learning samples on the basis of a predetermined rule. For example, if the rule specifies that a scene forming one sample is classified into the former part and the latter part, and that ten images are extracted from one sample as the learning samples with three of the ten images extracted from the former part and the remaining seven of the ten images extracted from the latter part, the learning sample selection unit 23 extracts ten learning samples from one sample on the basis of the above-described rule.

The statistical analysis processing unit 24 performs the statistical analysis processing by using the learning samples selected by the learning sample selection unit 23. For example, the statistical analysis processing unit 24 performs principal component analysis by using the ten learning samples selected by the learning sample selection unit 23, and analyses the feature of the scene from which the learning samples have been extracted. That is, the statistical analysis processing unit 24 performs the processing using the learning samples to calculate the feature quantity of the scene.

The storage unit 25 appropriately stores data necessary for the processing performed by the respective units of the information processing apparatus 11.

Figure 2:
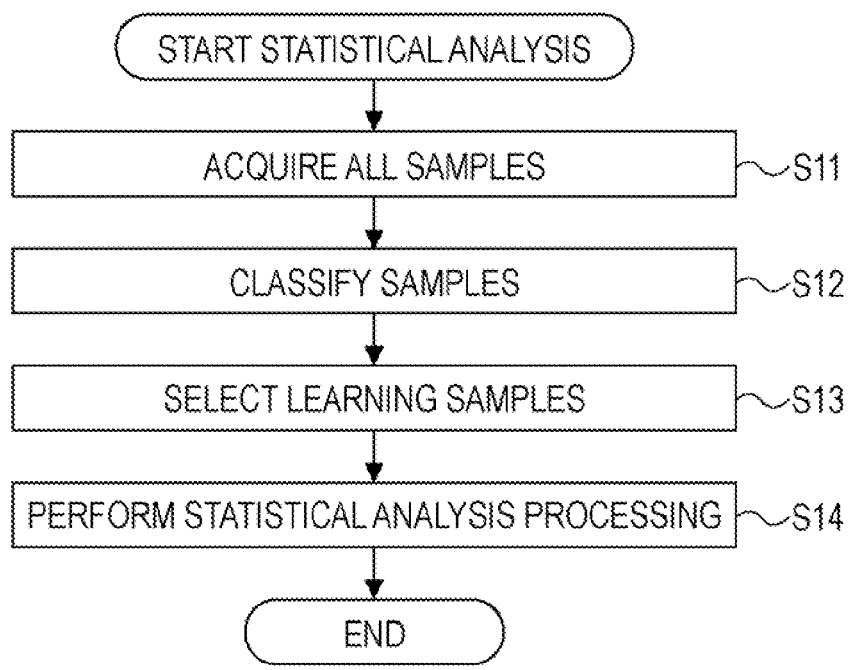
FIG. 2 is a flowchart for explaining operations of the information processing apparatus.

Subsequently, operations of the information processing apparatus 11 illustrated in FIG. 1 will be described with reference to the flowchart of FIG. 2.

At Step S11, the sample acquisition unit 21 of the information processing apparatus 11 acquires all samples. For example, in a setting in which a plurality of samples satisfying a predetermined condition are acquired from one program, the term "all samples" refers to all of the samples satisfying the predetermined condition and acquired by the analysis of one program. The acquired samples are appropriately stored in the storage unit 25. Alternatively, upon acquisition the samples, the acquired samples may be subjected to the processing by the sample classification unit 22 without being stored.

At Step S12, the sample classification unit 22 classifies the acquired samples. At Step S13, the learning sample selection unit 23 selects and extracts the learning samples from the samples obtained as the result of the classification. Then, at Step S14, the statistical analysis processing unit 24 performs the statistical analysis processing using the extracted learning samples.

Supplemental description will be made of the classification performed at Step S12 and the selection performed at Step S13. In the past, the classification process of Step S12 and the selection process of Step S13 have not been performed. Thus, the learning samples have been randomly extracted from the acquired samples to be used in the statistical analysis processing. For example, if a predetermined scene of a program forms a sample, a predetermined number of images (image data) have been randomly extracted from the scene to use the image data of the images in the statistical analysis processing.

If the images are thus randomly extracted from a predetermined scene, the extracted images may be biased toward the images of the former part of the scene, for example. In this case, there is no problem if the former part of the scene includes such learning samples that can produce an appropriate analysis result from the statistical analysis processing performed at the subsequent stage. If the former part of the scene does not include such learning samples, however, it is difficult to calculate the appropriate analysis result.

According to the present embodiment, therefore, in the example described above, a scene is classified into a portion including an important image and a portion not including an important image. After the classification, the number of the learning samples to be selected is set in accordance with the degree of importance of the portions of the classified scene (the present embodiment also includes a case in which the number of the learning samples to foe selected has been previously set). That is, a setting is made such that many of the learning samples are selected from the important portion. With this configuration, it is possible to perform the statistical analysis processing by using much of the information of the important portion, and thus to acquire a more appropriate analysis result.

Whether or not a portion is important depends on a variety of conditions, such as the type of analysis result desired as the analysis result of the statistical analysis processing. Therefore, the type of classification to foe performed is appropriately set in accordance with the handled samples. Further, the classification is not limited to the classification into two groups. Thus, classification into more than two groups may be performed. Further, the number of information items to be selected from each of the portions obtained after the classification is appropriately set in accordance with the degree of importance of each of the portions in each classification.

With the above-described configuration in which the sample are classified and a larger number of the learning samples are extracted from the important portion of each of the classified samples, a more appropriate analysis result can be obtained.

Subsequently, description will be made with reference to a specific example. Herein, the result of the processing by the statistical analysis processing unit 24 is assumed to be information used in the processing at the subsequent stage not illustrated to recognize predetermined scenes (the information may be directly used or may be further processed to be indirectly used). Further, the predetermined scenes to be recognized, are herein assumed to be a home run scene, a hit scene, and so forth observed in baseball. In this case, a baseball broadcast program broadcast by television broadcasting, for example, is acquired as a sample.

Figure 3:
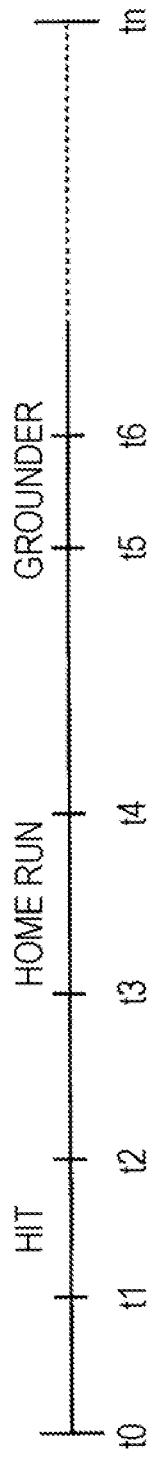
FIG. 3 is a diagram for explaining scenes.

Firstly, at Step S11, the sample acquisition unit 21 acquires the baseball broadcast program broadcast by television broadcasting, and extracts the predetermined scenes from the program. With reference to FIG. 3, the extracted scenes will be described. FIG. 3 illustrates scenes included in one program. The baseball, broadcast lasts for a period from a time t0 to a time tn. In the broadcast, a period from a time t1 to a time t2 corresponds to a hit scene, and a period from a time t3 to a time t4 corresponds to a home run scene. Further, a period from a time t5 to a time t6 corresponds to a grounder scene.

In this case, a portion corresponding to the period from the time t1 to the time t2 is extracted as the hit scene to be used as a sample of the hit scene. Further, a portion corresponding to the period from the time t3 to the time t4 is extracted, as the home ran scene to be used as a sample of the home run scene. Furthermore, a portion corresponding to the period from the time t5 to the time t6 is extracted as the grounder scene to be used as a sample of the grounder scene. Although not illustrated, it is needless to say that scenes other than the illustrated scenes, such as a strikeout scene and a base-stealing scene, may also be used as samples.

In this manner, if a predetermined scene is included in a program, a portion corresponding to the scene is extracted to be used as a sample, At Step S11, a plurality of scenes such as the hit scene and the home run scene are acquired as the samples from one program. Further, a plurality of programs are set as the retrieval targets, and a plurality of scenes such as the hit scene and the home run scene are similarly acquired as the samples from the plurality of programs.

At Step S12, each of the acquired samples is classified on the basis of a predetermined rule. Supplemental description will be made of the type of rule on the basis of which the classification is performed. As described above, the classification processing is performed such that the statistical analysis processing performed by the statistical analysis processing unit 24 produces a more desirable analysis result.

Therefore, the classification serves as a process for making many of the learning samples selected from the important portion.

Herein, if the analysis result is used as the information for recognizing the predetermined scenes, such as the home run scene and the hit scene of baseball, i.e., if the analysis result is used as the information representing the feature quantity of such scenes, it is necessary that the analysis result forms information enabling accurate identification of each of the scenes, i.e., identification of the scene as the home run scene, the hit scene, or the like. It is therefore necessary that the sample classification processing performed at Step S12 serves as a process enabling acquisition of the learning samples necessary for the generation of the information enabling the accurate identification of each of the scenes.

Figure 4A:
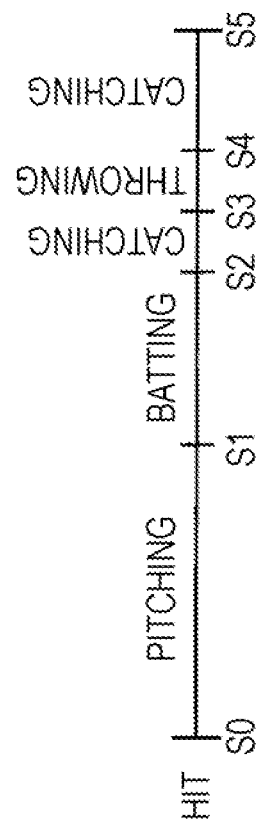
FIGS. 4A and 4B are diagrams for explaining classification of the scenes.
Figure 4B:
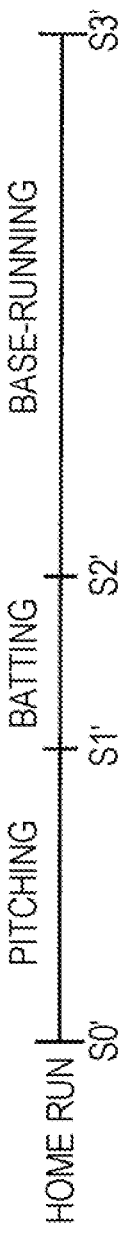

Herein, with reference to FIGS. 4A and 4B, a method of classification will be described with the hit scene and the home run scene taken as examples. The diagram of FIG. 4A illustrates the contents included in the hit scene, while the diagram of FIG. 4B illustrates the contents included in the home run scene.

In the hit scene, a period from a time S0 to a time S1 corresponds to a pitching scene, and a period from the time S1 to a time S2 corresponds a batting scene. Further, a period from the time S2 to a time S3 corresponds to a catching scene, and a period from the time S3 to a time S4 corresponds to a throwing scene. Further, a period from the time S4 to a time S5 corresponds to a catching scene.

In the home run scene, a period from a time S0' to a time S1' corresponds to a pitching scene, and a period from the time S1' to a time S2' corresponds to a batting scene. Further, a period from the time S2' to a time S3' corresponds to a base-running scene.

When the hit scene and the home run scene are compared to each other, the both scenes include the pitching scene and the batting scene. The pitching scene is included not only in the hit scene and the home run scene but also in such scenes as the grounder scene and the strikeout scene. Therefore, the pitching scene is considered to be the scene most frequently included in the broadcast of one game. For example, there are cases in which the pitching scene occupies approximately 50% of the broadcast of one game. Further, the pitching scene is normally captured by a fixed camera. Therefore, the pitching scene does not have a substantial change in image, even if a pitcher is replaced.

If the learning samples are randomly selected from the samples, the pitching scenes are highly likely to be selected as the learning samples due to the high percentage thereof in all scenes. However, the changes occurring in the pitching scenes are small. Therefore, if such scenes are selected, as the learning samples, and if the number of such scenes is large, the pitching scenes significantly affect the processing result of the statistical analysis processing.

If a scene such as the pitching scene becomes dominant, the proportion of a variety of other scenes originally included, in the video of the program, becomes relatively small. As a result, there may arise an undesirable situation, e.g., a situation in which the analysis result of the statistical analysis processing is dominated by the pitching scene and thus is inappropriate as the information used to recognize such scenes as the hit scene and the home run scene. In view of this, a configuration is made such that the scenes are classified into such scenes as described above and the other scenes, and the number of the learning samples selected from such scenes is reduced. With this configuration, a more appropriate analysis result can be obtained.

That is, in the above case, a predetermined scene is classified into an important portion expected to represent the feature of the scene and an unimportant portion not representing much of the feature of the scene.

At Step S12, therefore, the acquired samples are classified into the pitching scene and the other scenes. Then, in the selection of the learning samples at Step S13, the learning samples are selected such that the number of the learning samples selected from the other scenes is larger than the number of the learning samples selected from the pitching scene.

For example, when the total number of the learning samples acquired from one scene is represented as N and the percentage of selection (the selection rate) of the learning samples from the pitching scene is represented as x %, the number P1 of the learning samples selected from the pitching scene and the number P2 of the learning samples selected from the scenes other than the pitching scene are calculated from the following equations:

$$\text{Number } P1 = (N \times x)/100$$

$$\text{Number } P2 = (N \times (100-x))/100$$

In this case, if the value of x is set to be 50 or less, the number of the learning samples selected from the pitching scene can be made less than the number of the learning samples selected from the scenes other than the pitching scene.

In this description, one sample is classified into two groups. Alternatively, one sample can be classified into more than two groups. For example, with reference again to FIGS. 4A and 4B, the hit scene and the home run scene both include not only the pitching scene but also the batting scene. Thus, one sample may be classified into three groups, e.g., the pitching scene, the batting scene, and the other scenes. Further, the number of the learning samples to be selected may be differently set for each of the three classified scenes. For example, the ratio of the number of the learning samples selected from, the pitching scene, the batting scene, and the other scenes may be set to be 1:2:3.

Further, the learning samples are acquired from a plurality of scenes. Thus, the value of N may be set such that the sum of the learning samples acquired from the plurality of scenes becomes constant. For example, if a hundred learning samples are acquired in total, and if the learning samples are acquired from, ten scenes, the value of N is set to be ten (=100/10). Alternatively, if the learning samples are acquired from five scenes, the value of N is set to be twenty (=100/5).

With this classification of the samples and selection of different numbers of the learning samples from the respective portions obtained after the classification, it is possible to acquire the learning samples with which a desirable statistical analysis processing result can be obtained.

The thus selected learning samples are used to perform the statistical analysis processing at Step S14. As the statistical analysis processing, the principal component analysis can be used, for example. In the principal component analysis or the like, if there is a value substantially different from the value of the principal component, the value may affect the analysis result. To obtain a desirable analysis result, therefore, it is necessary to prevent such a value from, being included in the data used in the analysis. With the application of the present invention, more appropriate learning samples can be acquired. As a result, it is possible to exclude the value substantially different from the value of the principal component, and thus to acquire a more desirable analysis result.

In the statistical analysis processing, if the analysis is performed solely with the learning samples selected from a plurality of hit scenes, for example, the feature quantity of the hit scene can be calculated. In the calculation of the feature quantity of the hit scene, if many of the learning samples are extracted from the pitching scene, the calculated feature quantity may become more like the feature quantity of the pitching scene. In the present embodiment, however, the learning samples are acquired in the above-described manner. Therefore, such inconvenience can be avoided.

Further, it is possible to prevent the learning samples from being selected from the pitching scene (e.g., to set the value of x to zero). However, there is a sequence of flow from the pitching to the batting. Thus, if the pitching and the batting are classified completely separately from each other, the hit scene may not be completely reproduced, for example. According to the present embodiment, however, the feature quantity of a predetermined scene can be calculated from the sequence of flow from the pitching to the batting. Further, weighting can be performed such that a larger number of the learning samples are acquired from the important portion.

Accordingly, data usable in highly accurate scene recognition can be generated.

As described above, in the generation of the data used to recognize a predetermined scene, the present embodiment can increase the amount of information acquired from the portion considered to be important in the recognition of the scene. That is, the present embodiment can acquire information by performing weighting of information, and thus can generate information relying on important information.

In the embodiment described above, the description has been made with the baseball broadcast program taken as an example. If similar processing is performed also on another program, appropriate learning samples for the statistical analysis processing can be acquired. Further, it is needless to say that objects other than the programs can also be used as the samples.

Meanwhile, as described above, if the statistical analysis processing is performed on a predetermined program broadcast by television broadcasting, for example, the storage unit 25 that stores the data of the program is necessary. However, the storage capacity of the storage unit 25 is limited. Thus, it is difficult to store a large number of the learning samples. Further, an increase in the number of the learning samples results in an increase in the analysis time. Thus, there is also a time limitation. As a result, there is a limitation in increasing the number of the learning samples.

If a large number of the learning samples are stored and analysed, the accuracy of the analysis result can be improved. If there are the limitations as described above, however, such improvement is difficult to attain. In view of this, it is conceivable to store and analyze a small number of the learning samples. With the application of the present invention, appropriate learning samples can be acquired, as described above. Therefore, even with a small number of the learning samples, a desirable analysis result can be obtained. Further, it suffices if a small number of the learning samples can be stored. Therefore, the storage capacity for storing the learning samples can be reduced.

Further, the result of the statistical analysis processing such as the principal component analysis using the learning samples has a smaller amount of data than the amount of data of the learning samples. That is, if the statistical analysis processing such as the principal component analysis is performed, the information subjected to the statistical analysis processing can be implemented in a lower dimension than the information prior to the statistical analysis processing, while maintaining the feature quantity having the same expressive power as the expressive power of the information prior to the statistical analysis processing. Therefore, the amount of data of each sample can be reduced. Accordingly, the storage capacity for storing the analysis result of the statistical analysis processing can also be reduced.

Recording medium: The sequence of processing described above can be performed both by hardware and software. To perform the sequence of processing by software, a program forming the software is installed from a program recording medium on a computer incorporated in special hardware or a general-purpose personal computer, for example, which can perform a variety of functions by installing a variety of programs thereon.

Figure 5:
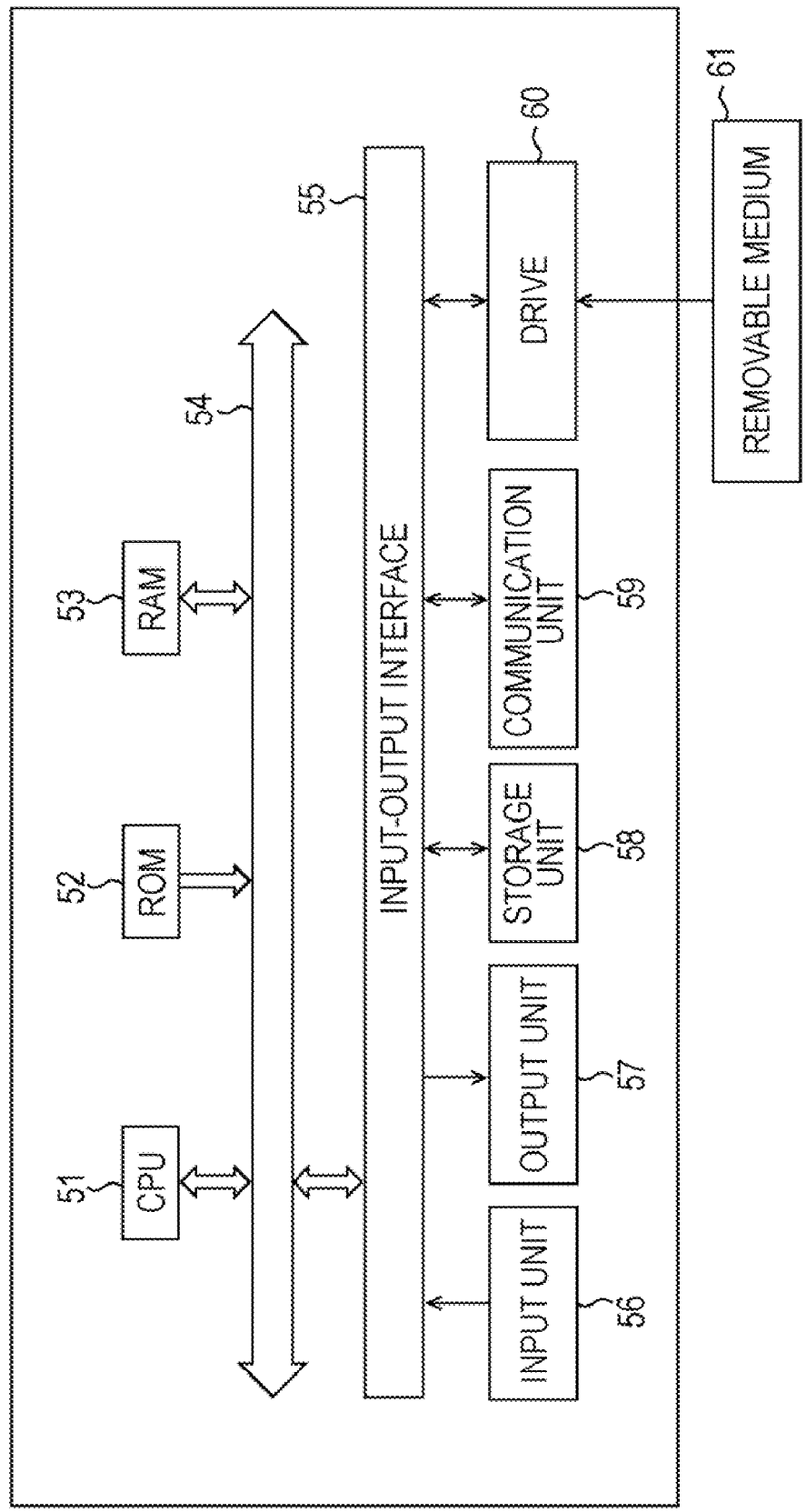
FIG. 5 is a diagram for explaining a recording medium.

FIG. 5 is a block diagram illustrating a configuration example of the hardware of a personal computer that performs the above-described sequence of processing on the basis of the program.

In the computer, a. CPU (Central Processing Unit) 51, a ROM (Read Only Memory) 52, and a RAM (Random Access Memory) 53 are connected to one another by a bus 54.

The bus 54 is further connected to an input-output interface 55. The input-output interface 55 is connected to an input unit 56, an output unit 57, a storage unit 58, a communication unit 59, and a drive 60. The input unit 56 includes a keyboard, a mouse, a microphone, and so forth. The output unit 57 includes a display, a speaker, and so forth. The storage unit 58 includes a hard disc, a nonvolatile memory, and so forth. The communication unit 59 includes a network interface and so forth. The drive 60 drives a removable medium 61, such as a magnetic disc, an optical disc, a magneto-optical disc, or a semiconductor memory.

In the thus configured computer, the CPU 51 loads the program stored in the storage unit 58, for example, into the RAM 53 via the input-output interface 55 and the bus 54, and executes the program. Thereby, the above-described sequence of processing is performed.

The program executed by the computer (the CPU 51) is provided as recorded on the removal medium 61, which is a packaged medium, such as a magnetic disc (including a flexible disc), an optical disc (a CD-ROM (Compact Disc-Read Only Memory), a DVD (Digital Versatile Disc), or the like), a magneto-optical disc, or a semiconductor memory, for example. Alternatively, the program is provided via a wired or wireless transmission medium, such as a local area network, the Internet, and digital satellite broadcasting.

Further, as the removable medium 61 is loaded into the drive 60, the program can be installed in the storage unit 58 via the input-output interface 55. Further, the program can be received by the communication unit 59 via a wired or wireless transmission medium and installed in the storage unit 58. Further, the program can be previously installed in the ROM 52 or the storage unit 58.

The program executed by the computer may be a program chronologically executed in accordance with the order described in the present specification, or a program executed concurrently or at necessary timing such as upon invocation of the program.

Further, in the present specification, a system refers to the entirety of an apparatus formed, by a plurality of devices.

The embodiments of the present invention are not limited to the embodiments described above, and thus can be modified in a variety of ways within a scope not departing from the gist of the present invention.

What is claimed is:

1. An information processing apparatus comprising:
   statistical analysis processing means for performing statistical analysis processing;
   acquisition means for acquiring samples to be processed by the statistical analysis processing means;
   classification means for classifying the samples acquired by the acquisition means; and
   selection means for selecting from the samples classified by the classification means learning samples to be used in the statistical analysis processing by the statistical analysis processing means,
   wherein the samples include predetermined scenes of a program broadcast by television broadcasting,
   wherein the classification means divides each of the scenes into two or more portions, and
   wherein the selection means selects a predetermined number of the learning samples from each of the divided scenes.

2. The information processing apparatus according to claim 1,
   wherein the statistical analysis by the statistical analysis processing means includes principal component analysis.

3. The information processing apparatus according to claim 1,
   wherein the selection means selects many of the learning samples from highly important samples of the samples.

4. An information processing method performed by an information processing apparatus including statistical analysis processing means for performing statistical analysis processing, the information processing method comprising the steps of:
   acquiring samples to be processed by the statistical analysis processing means;
   classifying the acquired samples; and
   selecting from the classified samples learning samples to be used in the statistical analysis processing by the statistical analysis processing means,
   wherein the samples include predetermined scenes of a program broadcast by television broadcasting,
   wherein the step of classifying divides each of the scenes into two or more portions, and
   wherein the step of selecting selects a predetermined number of the learning samples from each of the divided scenes.

5. A non-transitory computer storage medium for storing a program that controls an information processing apparatus including statistical analysis processing means for performing statistical analysis processing, the program causing a computer to perform processing comprising the steps of:
   acquiring samples to be processed by the statistical analysis processing means;
   classifying the acquired samples; and
   selecting from the classified samples learning samples to be used in the statistical analysis processing by the statistical analysis processing means,
   wherein the samples include predetermined scenes of a program broadcast by television broadcasting,
   wherein the step of classifying divides each of the scenes into two or more portions, and
   wherein the step of selecting selects a predetermined number of the learning samples from each of the divided scenes.

6. A recording medium recorded with a program that causes a computer controlling an information processing apparatus including statistical analysis processing means for performing statistical analysis processing to perform processing comprising the steps of:
   acquiring samples to be processed by the statistical analysis processing means;
   classifying the acquired samples; and
   selecting from the classified samples learning samples to be used in the statistical analysis processing by the statistical analysis processing means,
   wherein the samples include predetermined scenes of a program broadcast by television broadcasting,
   wherein the step of classifying divides each of the scenes into two or more portions, and
   wherein the step of selecting selects a predetermined number of the learning samples from each of the divided scenes.

7. An information processing apparatus comprising:
   a statistical analysis processing device configured to perform statistical analysis processing;
   an acquisition device configured to acquire samples to be processed by the statistical analysis processing device;
   a classification device configured to classify the samples acquired by the acquisition device; and
   a selection device configured to select from the samples classified by the classification device learning samples to be used in the statistical analysis processing by the statistical analysis processing device,
   wherein the samples include predetermined scenes of a program broadcast by television broadcasting,
   wherein the classification device divides each of the scenes into two or more portions, and
   wherein the selection device selects a predetermined number of the learning samples from each of the divided scenes.

* * * * *